June 7, 1927.

F. EVERT

FLOWERPOT

Filed Feb. 9, 1926

1,631,802

Witnesses:

Inventor:
Frank Evert,
By Joshua R. H. Potts
his Attorney.

Patented June 7, 1927.

1,631,802

UNITED STATES PATENT OFFICE.

FRANK EVERT, OF CHICAGO, ILLINOIS.

FLOWERPOT.

Application filed February 9, 1926. Serial No. 86,993.

My invention relates to a flower pot, and the same has for its main object the provision of an improved receptacle of this kind which will not retain excess water, so that flowers and plants, which are injuriously affected or readily "drowned out" by an excess of water, can be more successfully grown by persons inexperienced in methods of cultivation.

By experimentation, I have ascertained that many kinds of flowers and plants thrive best when the water is not retained by the bottom of the pot or receptacle but is permitted freely to escape as it filters to the bottom through the earth. To this end, I have provided a flower pot or receptacle, constructed and arranged to have an interior drain trough for receiving the excess water and to have drain outlets for the trough.

Other objects will appear hereinafter.

The invention consists in the combinations and arrangements of parts hereinafter described and claimed.

Figure 1:
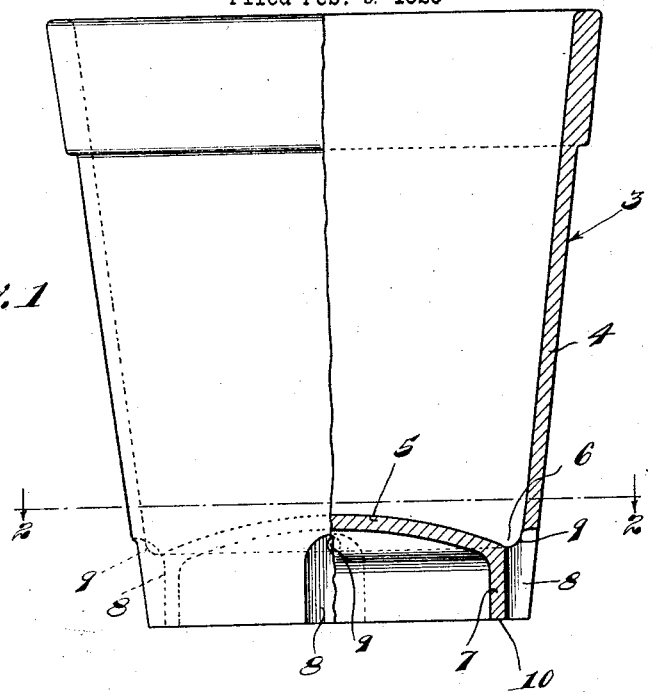
Figure 2:
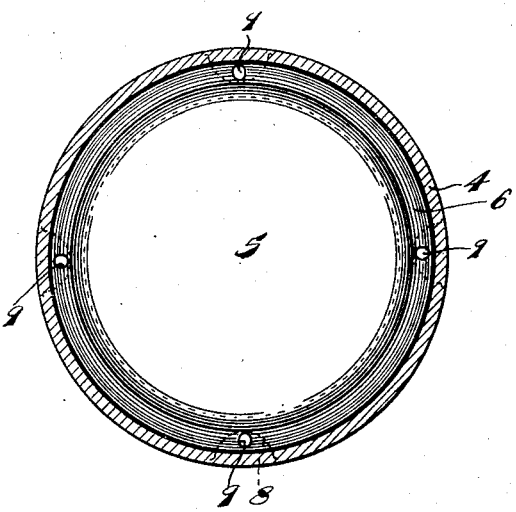

The invention will be best understood by reference to the accompanying drawing forming a part of this specification, and in which, Fig. 1 represents a side elevation and section of the flower pot made in accordance with my invention; and, Fig. 2 represents a horizontal cross section taken substantially on the line 2—2 of Fig. 1.

The preferred form of construction, as illustrated in the accompanying drawing, comprises a flower pot 3 made with an encompassing side wall 4 of any conventional or suitable form, and made with a bottom 5 of convex form interiorly of the pot so as to drain the seepage into a drain trench 6 formed at the junction of the bottom 5 with the side wall 4.

Preferably and as shown, the pot is also made with a depending flange 7 which serves as a base for its support and which is formed as a continuation of the side wall 4 and of the bottom 5. The flange 7 is provided at intervals with exterior drain outlet channels 8 in the form of grooves into which the drained off water passes through openings 9 from the drain trench 6. By this arrangement, the water drains downwardly through the openings 9 into the drain outlet channels 8. The flange 7 is preferably made relatively deep as shown so that the openings 9 will be situated at a considerable distance above the lower edge 10 of the flange. By this arrangement, free drainage through the openings 9 may be had even when the pot is placed in a catch basin or other receptacle.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention, what I claim as new and desire to secure by Letters Patent is:

1. A flower pot comprising a side wall having a thickened supporting flange at the lower end thereof, a bottom for the pot at the upper end of the supporting flange and forming a drain trench with the side wall; and channels in the form of grooves extending into the body of the supporting flange from the outer face thereof in communication at their upper ends with said trench, substantially as described.

2. A flower pot comprising a side wall and a bottom wall united to provide an interior drain trench; a flange on which to support the pot constituting a continuation of the side wall and thickened below the drain trench; channels in the form of grooves extending into the body of the flange from the outer face thereof; there being openings between the drain trench and grooves to drain water from the former into the latter, substantially as described.

In testimony whereof I have signed my name to this specification.

FRANK EVERT.